(12) United States Patent
Negishi et al.

(10) Patent No.: US 10,809,048 B2
(45) Date of Patent: Oct. 20, 2020

(54) PROBE SYSTEMS AND METHODS FOR CALIBRATING CAPACITIVE HEIGHT SENSING MEASUREMENTS

(71) Applicant: FormFactor Beaverton, Inc., Beaverton, OR (US)

(72) Inventors: Kazuki Negishi, Hillsboro, OR (US); Joseph George Frankel, Beaverton, OR (US); Eric Robert Christenson, Tualatin, OR (US)

(73) Assignee: FormFactor Beaverton, Inc., Beaverton, OR (US)

( * ) Notice: Subject to any disclaimer, the term of this patent is extended or adjusted under 35 U.S.C. 154(b) by 0 days.

(21) Appl. No.: 16/730,584

(22) Filed: Dec. 30, 2019

(65) Prior Publication Data

US 2020/0217638 A1 Jul. 9, 2020

Related U.S. Application Data

(60) Provisional application No. 62/789,625, filed on Jan. 8, 2019.

(51) Int. Cl.
*G01B 7/06* (2006.01)

(52) U.S. Cl.
CPC .................. *G01B 7/082* (2013.01)

(58) Field of Classification Search
CPC .......... G01B 7/082; G01B 13/02; G01B 7/06; G01B 7/08; G01R 1/07342; G01R 31/2891; G01R 1/06794; G01R 1/07314; G01R 1/07378; G01R 31/311; G01R 15/165; G01R 1/06705; G01R 25/005; G01R 31/2648; G01R 31/2656; G01R 31/2831;
(Continued)

(56) References Cited

U.S. PATENT DOCUMENTS

| 4,539,835 A | 9/1985 | Shambroom et al. |
| 6,337,218 B1 * | 1/2002 | Uzoh .................. G01R 1/06705 257/780 |

(Continued)

FOREIGN PATENT DOCUMENTS

WO WO 2011/137451 11/2011

OTHER PUBLICATIONS

Lion Precision, Application Note LA05-0060, *Linear Displacement Measurement with Noncontact Sensors*, May 2014.

*Primary Examiner* — Lee E Rodak (74) *Attorney, Agent, or Firm* — Dascenzo Intellectual Property Law, P.C.

(57) ABSTRACT

Probe systems and methods for calibrating capacitive height sensing measurements. A probe system includes a probe assembly with a probe support body that supports a capacitive displacement sensor that terminates in a sensing tip relative to a substrate and that is configured to generate an uncalibrated capacitive height measurement. A method of utilizing the probe system to generate a calibrated capacitive height measurement includes receiving a height calibration structure architecture; calculating a layer impedance magnitude of each substrate layer of the height calibration structure; and calculating a total layer impedance magnitude of the height calibration structure. The method further includes measuring a measured impedance magnitude and calculating the calibrated capacitive height measurement.

20 Claims, 3 Drawing Sheets

(58) Field of Classification Search
CPC . G01R 31/2887; G01R 31/304; G01R 35/005
See application file for complete search history.

(56) References Cited

U.S. PATENT DOCUMENTS

| | | | | |
|---|---|---|---|---|
| 7,019,513 B1* | 3/2006 | Faifer | ............... | G01R 31/311 |
| | | | | 324/754.23 |
| 8,421,491 B2* | 4/2013 | Chen | ............... | G01R 31/2891 |
| | | | | 324/754.21 |
| 8,570,055 B2* | 10/2013 | De Boer | ............ | G01B 7/023 |
| | | | | 324/686 |
| 2003/0080763 A1* | 5/2003 | Yu | .................. | G01R 1/07314 |
| | | | | 324/750.17 |
| 2003/0080764 A1* | 5/2003 | Zhou | ............... | G01R 1/07314 |
| | | | | 324/750.25 |
| 2007/0247177 A1* | 10/2007 | Ruckenbauer | ..... | G01R 31/2891 |
| | | | | 324/750.19 |
| 2008/0100312 A1* | 5/2008 | Breinlinger | ........ | G01R 31/2891 |
| | | | | 324/756.03 |

* cited by examiner

PROBE SYSTEMS AND METHODS FOR CALIBRATING CAPACITIVE HEIGHT SENSING MEASUREMENTS

RELATED APPLICATION

This application claims priority to U.S. Provisional Patent Application No. 62/789,625, which is entitled PROBE SYSTEMS AND METHODS FOR CALIBRATING CAPACITIVE HEIGHT SENSING MEASUREMENTS, was filed on Jan. 8, 2019, and the complete disclosure of which is hereby incorporated by reference.

FIELD OF THE DISCLOSURE

The present disclosure relates generally to probe systems and methods for calibrating capacitive height sensing measurements.

BACKGROUND OF THE DISCLOSURE

Probe systems may be utilized to test the operation of a device under test (DUT). As an example, a probe system may utilize a silicon photonics coupling technique in which one or more optical fibers interface with the DUT via an optical signal. In such an example, each optical fiber generally does not contact the DUT, but instead is aligned with an optical coupler such as a grating coupler on the DUT to transmit and receive the optical signal. Such an arrangement benefits from precise alignment between the optical fiber and the optical coupler to enhance power transfer between the optical fiber and the DUT.

Silicon photonics coupling techniques may utilize capacitive height sensing measurements to determine a separation distance between the DUT and the optical fiber. Such capacitive height sensing measurements typically rely upon general material properties of the DUT, or of a substrate that supports the DUT, to convert a measured capacitance reading into a calculated separation distance. However, such measurement schemes generally do not account for the dielectric and resistivity properties of DUT structures and/or substrates with varied material properties. Thus, there exists a need for improved probe systems and methods for calibrating capacitive height sensing measurements.

SUMMARY OF THE DISCLOSURE

Probe systems and methods for calibrating capacitive height sensing measurements are disclosed herein. A probe system includes a probe assembly with a probe support body that supports a capacitive displacement sensor that terminates in a sensing tip in a spaced-apart relation relative to a substrate. The capacitive displacement sensor is configured to generate an uncalibrated capacitive height measurement that at least partially represents a sensing tip distance of the sensing tip from the substrate. A method of utilizing such a probe system to generate a calibrated capacitive height measurement includes receiving, with a controller, a height calibration structure architecture of a height calibration structure of the substrate, which includes information regarding one or more substrate layers of the height calibration structure. The method further includes calculating, with the controller and based, at least in part, on the height calibration structure architecture, a layer impedance magnitude of each substrate layer and calculating, with the controller and based, at least in part, on the calculating the layer impedance magnitude of each substrate layer, a total layer impedance magnitude of the height calibration structure. The method further includes measuring, with the capacitive displacement sensor, a measured impedance magnitude, and calculating, with the controller based, at least in part, on the total layer impedance magnitude and on the measured impedance magnitude, the calibrated capacitive height measurement.

DETAILED DESCRIPTION AND BEST MODE OF THE DISCLOSURE

Figure 1:
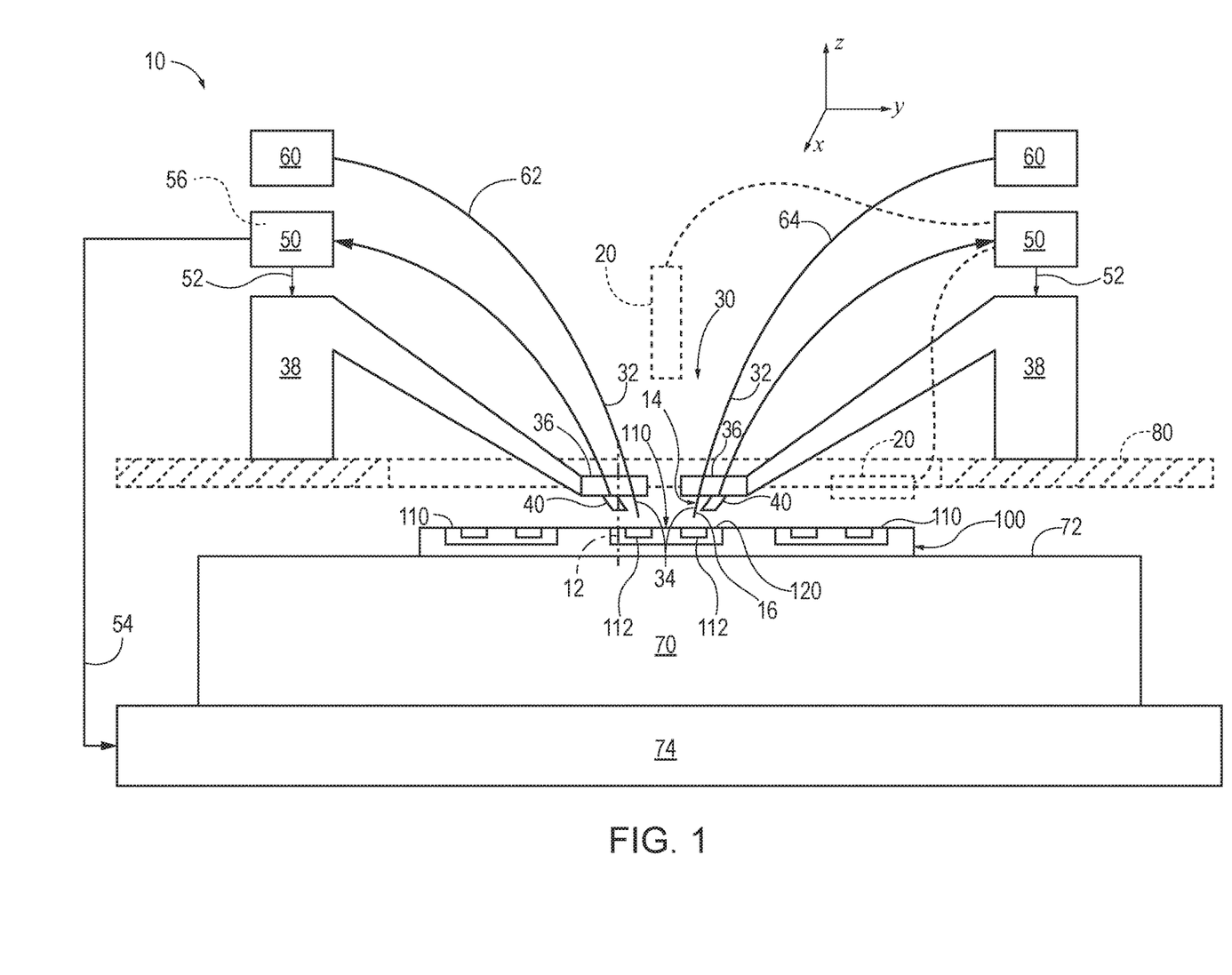
FIG. 1 is a schematic side elevation view of examples of probe systems according to the present disclosure.
Figure 2:
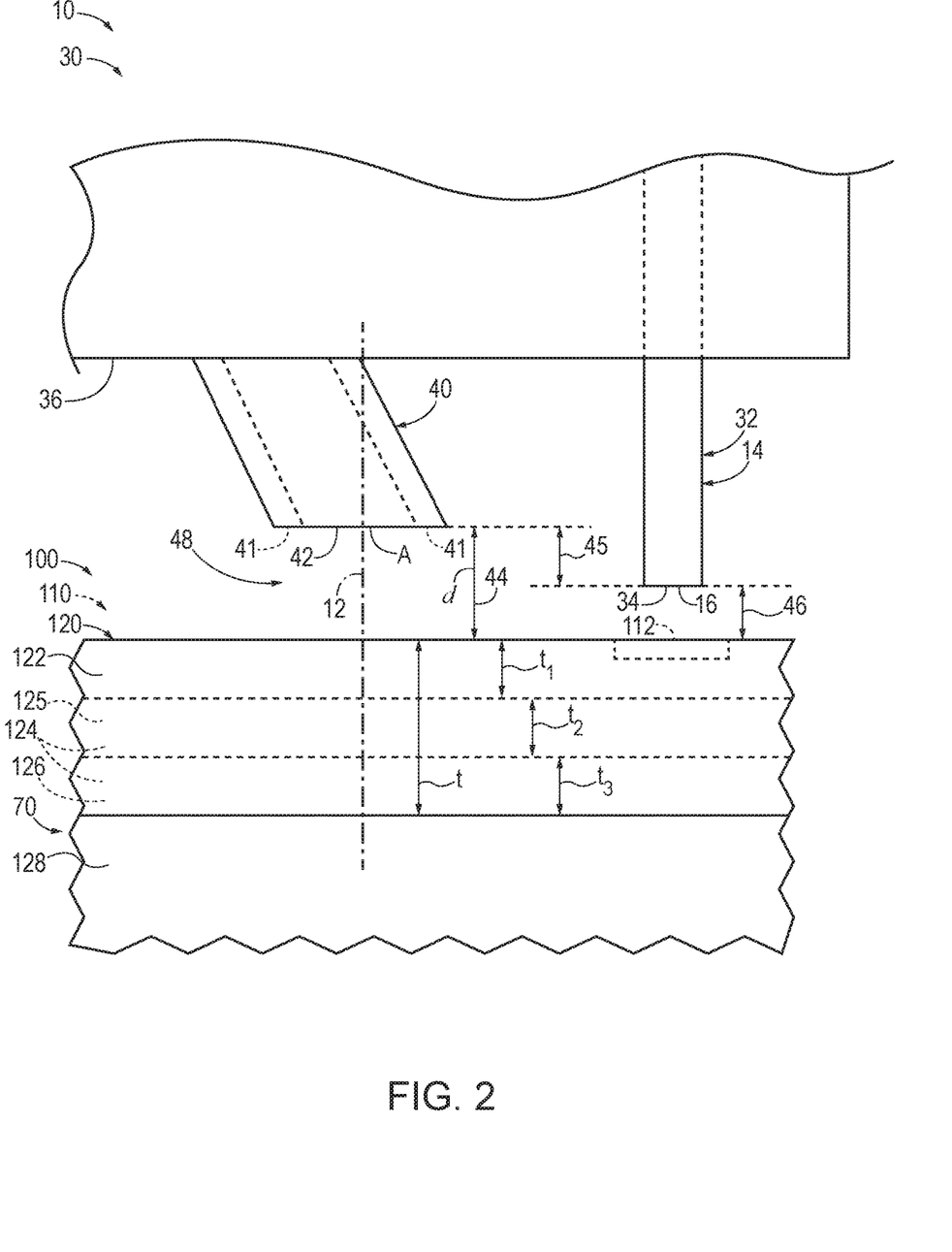
FIG. 2 is a schematic side elevation view of examples of probe systems according to the present disclosure.
Figure 3:
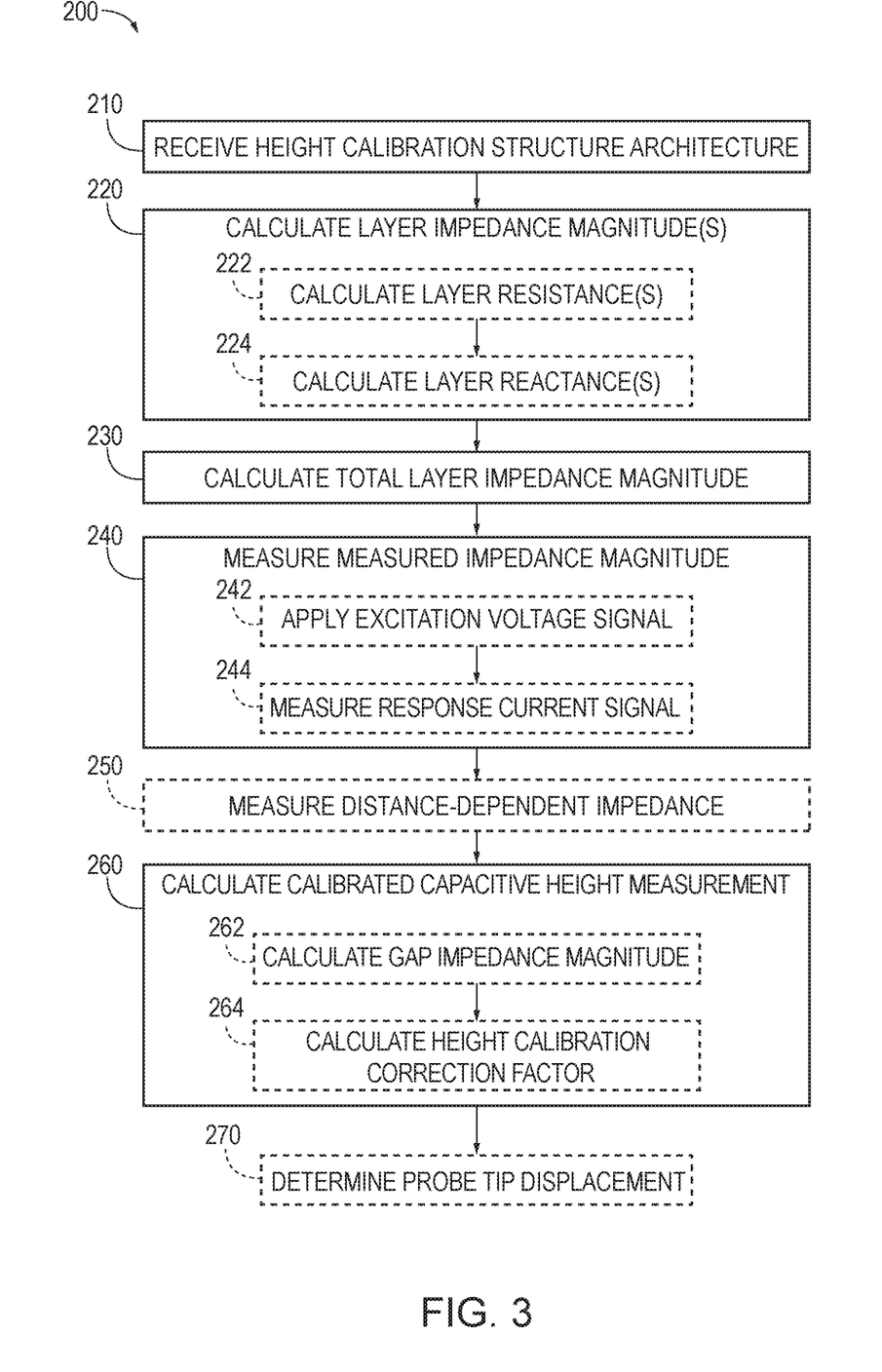
FIG. 3 is a flowchart depicting examples of methods, according to the present disclosure, of utilizing a probe system to calibrate a capacitive height sensing measurement produced by a capacitive sensor.

FIGS. 1-3 provide examples of probe systems 10 and/or of methods 200 according to the present disclosure. Elements that serve a similar, or at least substantially similar, purpose are labeled with like numbers in each of FIGS. 1-3, and these elements may not be discussed in detail herein with reference to each of FIGS. 1-3. Similarly, all elements may not be labeled in each of FIGS. 1-3, but reference numerals associated therewith may be utilized herein for consistency. Elements, components, and/or features that are discussed herein with reference to one or more of FIGS. 1-3 may be included in and/or utilized with any of FIGS. 1-3 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic side elevation view of examples of probe systems 10 according to the present disclosure, while FIG. 2 is a schematic side elevation view of a portion of the probe system of FIG. 1. As schematically illustrated in FIG. 1, a probe system 10 includes a chuck 70 that defines a support surface 72 that is configured to support a substrate 100 that includes one or more devices under test (DUTs) 110. Probe system 10 additionally includes a probe assembly 30 that is configured to test at least one of the one or more DUTs. As further schematically illustrated in FIG. 1, probe system 10 additionally includes a controller 50 that is operable to control probe system 10, probe assembly 30, and/or any appropriate component thereof, as described herein. That is, controller 50 is configured and/or programmed to control the operation of probe system 10 and/or a component thereof according to methods 200 according to the present disclosure.

As schematically illustrated in FIGS. 1-2, probe assembly 30 additionally includes a probe support body 36 and a capacitive displacement sensor 40 that is operatively supported by the probe support body. Capacitive displacement sensor 40 includes and/or terminates in a sensing tip 42 that is configured to be maintained in a spaced-apart configuration relative to substrate 100 during operative use of probe system 10. Specifically, capacitive displacement sensor 40 is configured to generate a capacitive height measurement that at least partially represents a sensing tip distance 44 (schematically illustrated in FIG. 2) between sensing tip 42 and substrate 100. As schematically illustrated in FIG. 2, sensing tip distance 44 may be measured along a direction parallel to a normal axis 12 that extends at least substantially perpendicular to a surface of substrate 100. As used herein, capacitive displacement sensor 40 also may be referred to as a capacitive distance sensor 40, a capacitive height sensor 40, and/or a capacitive sensor 40. Similarly, as used herein, positional terms such as "displacement," "distance," "offset," "height," and the like may be used interchangeably to describe a difference in position between two components, such as may be measured along a particular axis and/or dimension.

As described in more detail herein, one or more material properties of substrate 100 may result in capacitive displacement sensor 40 producing a capacitive height measurement that does not represent sensing tip distance 44 to a desirable degree of accuracy. Accordingly, the systems and methods disclosed herein generally are directed to calibrating the capacitive height measurement produced by capacitive displacement sensor 40 based, at least in part, on material properties of substrate 100.

In this manner, as used herein, the capacitive height measurement produced by capacitive displacement sensor 40 also may be referred to as an uncalibrated capacitive height measurement, and the probe systems 10 and methods 200 disclosed herein generally relate to methods of producing a calibrated capacitive height measurement that represents sensing tip distance 44 more accurately than the uncalibrated capacitive height measurement. As described in more detail herein and with reference to FIG. 3, methods 200 generally include producing the calibrated capacitive height measurement via calculation and/or measurement of an impedance associated with at least a portion of substrate 100. That is, because capacitive displacement sensor 40 generally operates via measurement of an impedance and/or of a capacitance that is assumed to correspond only to a capacitive reactance, determining the extent to which a measured impedance is attributable to substrate 100 enables a more accurate determination of the extent to which the measured impedance is attributable to a gap between sensing tip 42 and substrate 100. Such determinations thus facilitate a more accurate determination of sensing tip distance 44, as described herein.

As used herein, probe system 10 may be described as being "in operative use" and/or as being "operatively utilized" when substrate 100 is supported upon support surface 72 of chuck 70 and when probe assembly 30 and/or probe(s) 14 are positioned relative to substrate 100 such that each probe 14 is operable to test the corresponding DUT 110. In this manner, references within the present disclosure to probe system 10 (and/or a component thereof) in conjunction with substrate 100 (and/or a component thereof) are intended to refer to a configuration in which substrate 100 is operatively supported by and/or positioned within probe system 10, as described herein. However, while the present disclosure generally describes examples in which probe system 10 operatively interfaces with substrate 100, such examples are not intended to be limiting, and it is within the scope of the present disclosure that probe system 10 is not always operatively utilized in conjunction with substrate 100.

As additionally schematically illustrated in FIGS. 1-2, probe assembly 30 also may include one or more probes 14 operatively supported by probe support body 36 (one of which is schematically illustrated in FIG. 2), with each probe 14 being configured to test a corresponding DUT 110.

While FIG. 1 schematically illustrates probe system 10 as including two probes 14, it is additionally within the scope of the present disclosure that probe system 10 may include any appropriate number of probes 14, including one probe, two probes, three probes, four probes, or more than four probes.

Each probe 14 may have any appropriate form and/or may be configured to test the corresponding DUT 110 in any appropriate manner. As an example, and as schematically illustrated in FIGS. 1-2, each probe 14 may be described as including and/or terminating at a probe tip 16 that faces substrate 100 during operative use of probe system 10 and that is configured to interface with the corresponding DUT 110, such as via an electromagnetic signal and/or an optical signal. As shown in FIG. 2, each of capacitive displacement sensor 40 and probe 14 may be supported by probe support body 36 such that sensing tip 42 and probe tip 16 are separated by a tip offset 45, such as may be measured along a direction parallel to normal axis 12. Probe support body 36 may be configured such that tip offset 45, and/or such that a spatial relationship between sensing tip 42 and probe tip 16, is at least substantially fixed during operative use of probe system 10. As schematically illustrated in FIG. 2, probe tip 16 may be offset from sensing tip 42 by tip offset 45 such that probe tip 16 extends closer to substrate 100 than does sensing tip 42.

With continued reference to FIG. 2, probe system 10 further may be configured to produce a measurement of a probe tip displacement 46 between probe tip 16 and substrate 100, such as may be measured along a direction parallel to normal axis 12. For example, and as described herein, probe system 10 may be configured such that probe tip 16 is spaced apart from substrate 100 while probe 14 tests the corresponding DUT 110, and it may be desirable that probe tip displacement 46 be controlled and/or known to a high degree of accuracy. In such examples, and as described herein, probe tip displacement 46 may be determined via measurement and/or calculation of sensing tip distance 44 (e.g., via determination of the calibrated capacitive height measurement) and tip offset 45.

In some examples, and as schematically illustrated in FIGS. 1-2, each probe 14 includes and/or is an optical fiber 32 that is configured to transmit and/or receive optical signals, such as light signals and/or laser signals. Specifically, optical fiber 32 may be configured to transmit optical signals to DUT 110 and/or to receive optical signals from DUT 110 via a fiber tip 34 thereof. In this manner, fiber tip 34 may be described as representing probe tip 16 of an example of probe 14 that takes the form of optical fiber 32. In such examples, optical fiber 32 may be configured to interface with the corresponding DUT in any appropriate manner, such as via an optical coupler 112 of DUT 110 (schematically illustrated in FIGS. 1-2). Optical coupler 112 may include and/or be any appropriate non-contact interface, structure, and/or device, such as a grating coupler and/or a waveguide. While the present disclosure generally describes examples of probe system 10 in which each probe 14 is optical fiber 32, this is not required of all examples of probe system 10 and/or of methods 200, and it is additionally within the scope of the present disclosure that probe 14 may include and/or be, and/or that probe assembly 30 may include, any appropriate probe, such as a contact probe that is configured to convey an electric signal.

Probe system 10 may be configured to selectively and operatively align each probe 14 with the corresponding DUT 110 during operative use of probe system 10. For example, probe assembly 30 and/or probe support body 36 may be configured to position fiber tip 34 of optical fiber 32 relative to optical coupler 112 to optimize a coupling characteristic (such as power transfer) between optical fiber 32 and DUT 110. Probe system 10 may include any appropriate structure and/or mechanism for selectively aligning probe 14 with DUT 110. As an example, and as schematically illustrated in FIG. 1, probe system 10 may include a chuck translation stage 74 that operatively supports chuck 70 and/or that is configured to selectively and operatively translate chuck 70 and/or support surface 72 thereof relative to at least a portion of probe assembly 30. In this manner, chuck translation stage 74 may be configured to translate and/or align substrate 100, DUT 110, and/or optical coupler 112 relative to probe assembly 30, probe 14, probe tip 16, optical fiber 32, and/or fiber tip 34.

Chuck translation stage 74 may be configured to operatively translate chuck 70 relative to probe assembly 30 and/or to operatively rotate chuck 70 relative to probe assembly 30, such as to facilitate alignment between one or more DUTs 110 and probe 14. For example, chuck translation stage 74 may be configured to translate chuck 70 and/or substrate 100 relative to probe assembly 30 along a first axis and along a second axis that is perpendicular, or at least substantially perpendicular, to the first axis.

The first axis and the second axis both may be parallel, or at least substantially parallel, to chuck support surface 72. For example, the first axis may be oriented in the X-direction as illustrated in FIG. 1, and/or the second axis may be oriented in the Y-direction as illustrated in FIG. 1. Chuck translation stage 74 additionally or alternatively may be configured to operatively and/or simultaneously translate chuck 70 and/or substrate 100 relative to probe assembly 30 along a third axis that is perpendicular, or at least substantially perpendicular, to chuck support surface 72. For example, the third axis may be oriented in the Z-direction as illustrated in FIG. 1. Additionally or alternatively, chuck translation stage 74 may be configured to operatively and/or simultaneously rotate chuck 70 and/or substrate 100 about a rotation axis. The rotation axis may be perpendicular, or at least substantially perpendicular, to chuck support surface 72, and/or may be the third axis. In some examples, and as schematically illustrated in FIG. 1, controller 50 may be configured to generate and transmit a translation stage control signal 54 to selectively control chuck translation stage 74.

In some examples, and as further schematically illustrated in FIG. 1, probe system 10 additionally includes at least one probe positioner 38 that is operatively coupled to a corresponding probe support body 36 and that is configured to selectively position the corresponding probe support body 36 relative to substrate 100. In such examples, probe positioner 38 may be configured to selectively translate, rotate, and/or otherwise position probe assembly 30, probe support body 36, probe 14, probe tip 16, optical fiber 32, fiber tip 34, and/or capacitive displacement sensor 40 relative to DUT 110 and/or optical coupler 112, such as to optimize an optical coupling between optical fiber 32 and DUT 110. Each probe positioner 38 may be operatively supported relative to chuck 70 and/or substrate 100 in any appropriate manner. As an example, and as schematically illustrated in FIG. 1, probe assembly 10 may include a platen 80 that operatively supports each probe positioner 38 relative to chuck 70.

During operation of probe system 10, each probe positioner 38 may be utilized to operatively translate probe(s) 14 throughout a probe range-of-motion, thereby operatively translating probe tip(s) 16 relative to DUT 110. As an example, one or more probe positioners 38 may be utilized to operatively align one or more probe tips 16 with specific, target, and/or desired locations on DUT 110, such as to permit communication between the corresponding probes and the DUT. This may include operative translation of probes 14 in a plurality of different, separate, distinct, perpendicular, and/or orthogonal directions, such as the X-, Y-, and/or Z-directions that are illustrated in FIG. 1. In the example of FIG. 1, the X- and Y-directions may be parallel, or at least substantially parallel, to an upper surface of substrate 100, while the Z-direction may be perpendicular, or at least substantially perpendicular, to the upper surface of substrate 100. As further schematically illustrated in FIG. 1, the Z-direction may be at least substantially parallel to normal axis 12. However, this specific configuration is not required.

Each probe positioner 38 may include and/or be any suitable structure that may be operatively coupled to probe support body 36 and/or to probe 14, and/or that may be configured to operatively translate probe 14 throughout the probe range-of-motion, such as may extend in three orthogonal, or at least substantially orthogonal, axes, such as the X-, Y-, and Z-axes of FIG. 1. As examples, probe positioner 38 may include one or more translation stages, lead screws, ball screws, rack and pinion assemblies, motors, stepper motors, electrical actuators, mechanical actuators, piezo-actuators, micrometers, and/or manual actuators. Probe positioner 38 may be a manually actuated probe positioner and/or an automated, or electrically actuated, probe positioner. In some examples, and as schematically illustrated in FIG. 1, controller 50 may be configured to generate and transmit a probe positioner control signal 52 to selectively control probe positioner 38.

As discussed, probe system 10 generally is configured to position probe tip 16 and/or fiber tip 34 relative to DUT 110 and/or optical coupler 112, such as via chuck translation stage 74 and/or probe positioner 38. As an example, probe system 10 may be configured such that chuck translation stage 74 moves substrate 100 to position a selected DUT 110 generally under optical fiber 32 and such that probe positioner 38 subsequently aligns fiber tip 34 of optical fiber 32 with a selected optical coupler 112. In this manner, and as schematically illustrated in FIG. 1, each of two or more separate probe support bodies 36 supporting respective optical fibers 32 may utilize respective fiber positioning mechanisms 38 to align respective fiber tips 34 of the optical fibers with corresponding optical couplers 112 of a given DUT 110 independent of a translation provided by chuck translation stage 74.

As further schematically illustrated in FIG. 1, probe system 10 may include at least one imaging device 20 configured to receive an optical image of at least a portion of probe assembly 30 and/or of at least a portion of substrate 100, such as of DUT 110. For example, each imaging device 20 may be configured and/or positioned to receive an optical image of optical fiber 32 and/or fiber tip 34 relative to DUT 110 and/or optical coupler 112, such as to facilitate alignment of the fiber tip relative to the optical coupler. As schematically illustrated in FIG. 1, imaging device 20 may be configured to receive an optical image along any appropriate direction, such as a direction that is at least substantially parallel to normal axis 12 and/or a direction that is at least substantially perpendicular to the normal axis. Imaging device 20 may include and/or be any suitable structure that may be adapted, configured, designed, and/or constructed to generate one or more optical images of probe assembly 30 and/or of substrate 100. As examples, imaging device 20 may include and/or be one or more of a microscope, a microscope that includes an eyepiece, a microscope that does not include an eyepiece, a camera, a charge-coupled device, an imaging sensor, a solid-state imaging device, a C-MOS imaging device, and/or a lens.

As discussed, and as additionally schematically illustrated in FIG. 1, probe system 10 generally includes controller 50 that is programmed to control the operation of, or to automate, probe system 10. As an example, controller 50 may be programmed to execute some or all of the methods 200, which are described herein. Additionally or alternatively, controller 50 may be configured to control any suitable component of probe system 10, such as imaging device 20, probe assembly 30, probe positioner 38, and/or chuck translation stage 74.

A controller 50 may include and/or be any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure. Additionally or alternatively, controller 50 may include and/or be a computer that includes, or is configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

As further schematically illustrated in FIG. 1, probe system 10 and/or controller 50 may include a signal generation and analysis assembly 60. Signal generation and analysis assembly 60 may be configured to generate a test signal 62, to provide the test signal to DUT 110 via optical fiber 32, and/or to receive a resultant signal 64 from the DUT. For example, signal generation and analysis assembly 60 may include and/or be a laser source configured to output the test signal, in the form of an optical test signal, to DUT 110 via optical fiber 32. As another example, signal generation and analysis assembly 60 may include and/or be an optical signal analyzer configured to receive the resultant signal, in the form of an optical resultant signal, from DUT 110. Signal generation and analysis assembly 60, when present, additionally or alternatively may be configured to analyze resultant signal 64, to compare the resultant signal to test signal 62, and/or to quantify the operation of DUT 110 based, at least in part, on the test signal and/or on the resultant signal. As examples, signal generation and analysis assembly 60 may be configured to analyze the optical resultant signal from DUT 110, to compare the optical resultant signal to the optical test signal produced by the laser source, and/or to quantify the operation of the DUT based, at least in part, on the optical test signal and/or on the optical resultant signal.

As a more specific example, and as schematically illustrated in FIG. 1, probe system 10 may include a plurality of controllers 50 and/or signal generation and analysis assemblies 60, such that a first signal generation and analysis assembly 60 includes the laser source and a second signal generation and analysis assembly 60 includes the optical signal analyzer. In such an example, the first signal generation and analysis assembly 60 may be configured to generate test signal 62, and the second signal generation and analysis assembly 60 may be configured to analyze resultant signal 64, to compare the resultant signal to the test signal, and/or to quantify the operation of the DUT based, at least in part, on the test signal and/or on the resultant signal. As another example, DUT 110 may be electrically powered, and the DUT may be configured to generate and/or emit resultant signal 64 in the form of an optical resultant signal responsive to receipt of test signal 62 in the form of an electrical test signal. As yet another example, DUT 110 may be electrically powered, and the DUT may be configured to generate and/or emit resultant signal 64 in the form of an electrical resultant signal responsive to receipt of test signal 62 in the form of an optical test signal.

As used herein, positional terms such as "top," "upper," "bottom," "lower," and the like may be used to describe spatial relationships between components of probe systems 10 in an illustrative, non-limiting manner and generally refer to a configuration in which substrate 100 and/or DUT 110 extends at least substantially parallel to a ground surface and in which probe 14 and/or optical fiber 32 is positioned vertically above the substrate (e.g., such that a force of gravity has a direction that extends from the optical fiber toward the DUT). Thus, for example, optical fiber 32 may be described as being positioned above DUT 110. Such terms are provided as context only and do not limit component parts of probe systems 10 or of probe assemblies 30 to always be in a specific orientation relative to the ground.

Methods 200 according to the present disclosure are perhaps best understood with reference to FIG. 2, which schematically illustrates a portion of probe system 10 of FIG. 1. Specifically, FIG. 2 schematically illustrates optical fiber 32 and capacitive displacement sensor 40 supported above substrate 100. More specifically, FIG. 2 schematically illustrates optical fiber 32 and capacitive displacement sensor 40 supported above a height calibration structure 120 of substrate 100 by a gap 48, such as may be characterized by sensing tip distance 44. In this manner, sensing tip distance 44 additionally or alternatively may be described as a height of gap 48 in a direction parallel to normal axis 12. As used herein, and as schematically illustrated in FIG. 2, height calibration structure 120 may include and/or be any appropriate portion of substrate 100, such as a portion of DUT 110 and/or of optical coupler 112.

As schematically illustrated in FIG. 2, and as discussed, capacitive displacement sensor 40 includes sensing tip 42 that faces height calibration structure 120, for example, such that a surface of the sensing tip is at least substantially parallel to a surface of the height calibration structure. In this manner, sensing tip 42 may correspond to and/or be a portion of capacitive displacement sensor 40, such as a surface of the capacitive displacement sensor that is proximal height calibration structure 120. As discussed, a position of capacitive displacement sensor 40 and/or of sensing tip 42 relative to height calibration structure 120 may be characterized by sensing tip distance 44. As further schematically illustrated in FIG. 2, and as additionally discussed, a position of optical fiber 32 and/or of fiber tip 34 relative to height calibration structure 120 and/or optical coupler 112 may be characterized by probe tip displacement 46 between the fiber tip and the height calibration structure, such as along a direction at least substantially parallel to normal axis 12.

In some examples, and as discussed, probe system 10 is configured such that sensing tip 42 of capacitive displacement sensor 40 and fiber tip 34 of optical fiber 32 are maintained at a substantially fixed positional relationship. Stated differently, in such examples, probe system 10 is configured such that sensing tip distance 44 and probe tip displacement 46 are related via tip offset 45 that is equal to a difference between sensing tip distance 44 and probe tip displacement 46 and that is substantially fixed during operative use of probe system 10. In this manner, a precise measurement of sensing tip distance 44 as described herein may provide a similarly precise measurement of probe tip displacement 46 and/or of a position (e.g., a height) of fiber tip 34 relative to optical coupler 112.

While FIG. 2 schematically illustrates fiber tip 34 as extending nearer to height calibration structure 120 than does sensing tip 42 (i.e., such that probe tip displacement 46 is smaller than sensing tip distance 44), this is not required to all examples of probe system 10, and it is within the scope of the present disclosure that optical fiber 32 and capacitive displacement sensor 40 may have any appropriate relative arrangement. As examples, optical fiber 32 and capacitive displacement sensor 40 may have any appropriate relative arrangement in a vertical dimension and/or in a horizontal dimension. As more specific examples, optical fiber 32 and capacitive displacement sensor 40 may be positioned such that probe tip displacement 46 is greater than sensing tip distance 44 and/or such that probe tip displacement 46 and sensing tip distance 44 are at least substantially equal.

Capacitive displacement sensor 40 may include and/or be any appropriate apparatus for performing a capacitance displacement measurement. For example, capacitive displacement sensor 40 may include and/or be a capacitive linear displacement sensor, such as may be known in the field of metrology. Capacitive displacement sensor 40 may operate on the principle that the displacement to be measured (e.g., the capacitive height measurement) corresponds to a distance between two spaced-apart parallel conductive surfaces separated by a medium with a known dielectric constant. In such a simplified system, the capacitance C associated with the two parallel conductive surfaces is related to the distance d separating the surfaces, the area A of each surface facing the opposite surface, and the absolute permittivity $\varepsilon$ of the medium separating the surfaces as $C=\varepsilon A/d$. The absolute permittivity of the medium also may be expressed as $\varepsilon=\varepsilon_r\varepsilon_0$, where $\varepsilon_r$ is the dimensionless relative permittivity of the medium and $\varepsilon_0=8.854\times10^{-12}$ F/m is the vacuum permittivity. Accordingly, in an example in which sensing tip 42 of capacitive displacement sensor 40 has an area A and is separated from a conductor by a distance d that is equal to sensing tip distance 44, a determination of the capacitance C may enable a determination of the sensing tip distance. While such an analysis may enable an accurate determination of the sensing tip distance when the surface facing the capacitive displacement sensor is a conductor, this analysis may fail to produce an accurate measurement in other cases. For example, when the surface facing the capacitive displacement sensor includes one or more insulating and/or resistive layers in addition to a conductive layer (such as in the schematic example of FIG. 2), such insulating and/or resistive layers may introduce measurement errors, as discussed below.

In some examples, and as schematically illustrated in FIG. 2, capacitive displacement sensor 40 additionally includes a guard electrode 41 that extends at least substantially circumferentially surrounds sensing tip 42. In such examples, capacitive displacement sensor 40 may be configured to supply a guard voltage to guard electrode 41 during operative use of the capacitive displacement sensor, such as to enhance an accuracy of the capacitive height measurement. However, such a guard voltage also may be disruptive to a proper functioning of probe 14 and/or of DUT 110. Accordingly, probe assembly 30 may be configured to at least partially disable guard electrode 41 during operative use of the probe assembly to test DUT 110, such as by removing and/or ceasing to supply the guard voltage to the guard electrode.

Capacitive displacement sensor 40 may be configured to determine a capacitance associated with sensing tip 42 and a sensed surface under the simplifying assumption that the sensing tip and the sensed surface each are perfectly conductive surfaces separated by an insulator. As will be recognized by one skilled in the art of electronics, the impedance of a circuit element may be represented as $Z=R+jX$, where Z is the impedance of the circuit element, R is the resistance of the circuit element, X is the reactance of the circuit element, and $j^2=-1$.

As used herein, the resistance of a circuit element additionally or alternatively may be referred to as the resistive component of the impedance of the circuit element. Similarly, as used herein, the reactance of a circuit element additionally or alternatively may be referred to as the reactive component of the impedance of the circuit element. In the examples provided herein, the reactive component of an impedance additionally or alternatively may be referred to as the capacitive component of the impedance. Stated differently, in the examples provided herein, the reactive component of an impedance of a circuit element may not include an inductive component. Under the simplifying assumption that a circuit element consists of two perfectly conductive surfaces separated by a perfect resistor, the impedance of the circuit element may be regarded as being equal to the resistance of the circuit element, such that $Z=R$. Similarly, under the simplifying assumption that a circuit element consists of two perfectly conductive surfaces separated by an insulator, the impedance of the circuit element may be regarded as being equal to the reactance (i.e., the capacitive component of the impedance) of the circuit element, such that $|Z|=|X|$.

As will further be understood by one skilled in the art of electronics, the reactance of a circuit element generally depends upon a frequency f of an electrical signal that encounters the circuit element. In particular, the reactance of a capacitive circuit element is related to the capacitance C of the circuit element, the cross-sectional area A of each surface forming the capacitive circuit element, the distance d separating the surfaces forming the capacitive circuit element, and the frequency f of an electrical signal through the element as $X(f)=[2\pi fC]^{-1}=d/(2\pi f\varepsilon_r\varepsilon_0 A)$.

In this manner, capacitive displacement sensor 40 may be configured to determine the capacitance C via a measurement of a frequency-dependent impedance of a system under consideration. That is, by applying a voltage signal of magnitude V and frequency f to sensing tip 42 and measuring a corresponding current of magnitude I, the impedance Z may be calculated as $Z=V/I$. Under the assumption that this impedance includes only a capacitive reactance, this expression may be combined with the above expression of the reactance of a capacitor to yield $V/I=d/(2\pi f\varepsilon_r\varepsilon_0 A)$. Solving this expression for the distance d then yields $d=(2\pi f\varepsilon_r\varepsilon_0 A)V/I$, thus providing a means of determining the distance d from known and/or measured quantities.

In some examples, the aforementioned principles of operation of capacitive displacement sensor 40 are sufficient to produce a capacitive height measurement that accurately describes a distance between two components of probe system 10. For example, chuck 70 may be formed of a metal such as aluminum, and capacitive displacement sensor 40 may produce a capacitive height measurement that accurately measures a distance between chuck 70 and sensing tip 42 when support surface 72 and sensing tip 42 are separated only by vacuum and/or air. However, when substrate 100 and/or DUT 110 is positioned between support surface 72 and sensing tip 42, such materials may produce an electrical impedance that is not accounted for by the aforementioned principles of operation of capacitive displacement sensor 40. Accordingly, the probe system 10 and methods 200 disclosed herein generally are directed to correcting and/or calibrating the uncalibrated capacitive height measurement in view of these material properties.

As discussed, and as schematically illustrated in FIG. 2, methods 200 generally pertain to an example in which sensing tip 42 of capacitive displacement sensor 40 faces height calibration structure 120. As used herein, and as discussed, height calibration structure 120 may refer to, include, and/or be any appropriate portion of substrate 100 and/or DUT 110 at which sensing tip distance 44 and/or probe tip displacement 46 is to be measured. Probe systems 10 according to the present disclosure may be utilized to provide a measurement of sensing tip distance 44 via capacitive displacement sensor 40 even when height calibration structure 120 is not perfectly and/or uniformly conductive, and/or when gap 48 is not defined within a vacuum, or a perfect vacuum.

For example, FIG. 2 schematically illustrates a configuration in which height calibration structure 120 includes one or more stacked parallel layers with corresponding material properties. Specifically, and as schematically illustrated in FIG. 2, height calibration structure 120 may be described as having a surface layer 122 that faces capacitive displacement sensor 40 and that is positioned above a conductive bulk layer 128, such as may include and/or be a portion of chuck 70. As additionally schematically illustrated in FIG. 2, height calibration structure 120 further may include one or more subsurface layers 124 positioned between the surface layer and the conductive bulk layer. In the example of FIG. 2, height calibration structure 120 includes a first subsurface layer 125 and a second subsurface layer 126. As a more specific example, substrate 100 and/or height calibration structure 120 may utilize a silicon-on-insulator (SOI) architecture in which surface layer 122 and second subsurface layer 126 each are formed at least substantially of silicon, such as doped silicon, and in which first subsurface layer 125 is a buried oxide (BOX) layer. As more specific examples, each of surface layer 122 and second subsurface layer 126 may be formed at least substantially of doped silicon and may have a resistivity that is between about 0.001 Ohm centimeters and about 100 Ohm centimeters. Additionally or alternatively, first subsurface layer 125 may be a BOX layer that is formed at least substantially of silicon dioxide and that has a relative permittivity of about 3.8. However, this is not required, and it is additionally within the scope of the present disclosure that height calibration structure 120 may include any appropriate number of subsurface layers 124, or may not include any subsurface layers.

In the arrangement of FIG. 2, an impedance as measured between sensing tip 42 and conductive bulk layer 128 generally will depend upon the material properties (such as thickness, electrical resistivity, and relative permittivity) of surface layer 122, of each subsurface layer 124, and of the medium separating the sensing tip and the surface layer. For the purposes of the present disclosure, it is assumed that the medium occupying gap 48 is a perfect vacuum with infinite electrical resistivity and a relative permittivity equal to 1. However, this is not required, and it is additionally within the scope of the present disclosure that gap 48 may be occupied by any appropriate medium with any appropriate physical properties.

FIG. 3 is a flowchart depicting examples of methods 200, according to the present disclosure, of utilizing a probe system (such as probe system 10 of FIGS. 1-2) to generate a calibrated capacitive height measurement at least partially based upon a measured impedance magnitude produced by a capacitive displacement sensor (such as capacitive displacement sensor 40). As shown in FIG. 3, methods 200 include receiving, at 210, with a controller (such as controller 50), a height calibration structure architecture of a height calibration structure (such as height calibration structure 120) that includes one or more substrate layers of a substrate (such as surface layer 122 and/or one or more subsurface layers 124 of substrate 100). Methods 200 additionally include calculating, at 220, with the controller and based, at least in part, on the height calibration structure architecture, a layer impedance magnitude of each substrate layer, and calculating, at 230, with the controller and based, at least in part, on the calculated layer impedance magnitude of each substrate layer, a total layer impedance magnitude of the height calibration structure. Methods 200 further include measuring, at 240, with the capacitive displacement sensor, a measured impedance magnitude and calculating at, 260, with the controller and based, at least in part, on the total layer impedance magnitude and the measured impedance magnitude, the calibrated capacitive height measurement.

As discussed, a capacitive displacement sensor (such as capacitive displacement sensor 40) may be configured to determine a separation distance (such as sensing tip distance 44) via a measurement of an impedance associated with a region between two conductive surfaces. Methods 200 according to the present disclosure generally include calibrating and/or refining the measurement of the separation distance based on the impedance of the height calibration structure that is sensed by the capacitive displacement sensor. More specifically, methods 200 generally include analytically determining an impedance associated with the height calibration structure via the receiving the height calibration structure architecture at 210, the calculating the layer impedance magnitude(s) at 220, and the calculating the total layer impedance magnitude at 230. This analytically-determined impedance then may be compared to the measured impedance as measured by the capacitive displacement sensor at 240 to determine the portion of the total impedance that is associated with the gap (such as gap 48) separating the surface layer and a sensing tip (such as sensing tip 42) of the capacitive displacement sensor.

In general, and as discussed, the impedance of a given material (such as a material that forms a given substrate layer of the height calibration structure) may be described as having a resistance component and a reactance component. The resistance R of a three-dimensional circuit element generally is related to the electrical resistivity ρ of the circuit element, the cross-sectional area A of the circuit element, and the length $\ell$ of the circuit element as $R = \rho \ell / A$. Additionally, and as discussed, under the assumption that the reactance of a given circuit element is purely capacitive, the frequency-dependent reactance X(f) of a three-dimensional circuit element generally is related to the capacitance C of the circuit element, the cross-sectional area A of each surface forming the capacitive circuit element, the distance d separating the surfaces forming the capacitive circuit element, and the frequency f of an electrical signal through the element as $X(f)=[2\pi fC]^{-1}=d/(2\pi f\varepsilon_r\varepsilon_0 A)$.

Thus, to enable an analytical determination of the impedance of the height calibration structure, the receiving the height calibration structure architecture at 210 may include receiving a layer thickness of each substrate layer, an electrical resistivity of each substrate layer, a relative permittivity of each substrate layer, and/or a sensing tip surface area of the sensing tip that faces the height calibration structure. The layer thickness of each substrate layer may be measured along a direction parallel to a normal axis (such as normal axis 12) associated with the substrate. For example, in the example of FIG. 2, the height calibration structure may be described as having a total thickness $t=t_1+t_2+t_3$, where $t_1$ is the thickness of the surface layer, $t_2$ is the thickness of the first subsurface layer, and $t_3$ is the thickness of the second subsurface layer. The sensing tip surface area, labeled A in FIG. 2, may be measured in a plane perpendicular to the normal axis. The receiving the height calibration structure architecture at 210 with the controller may be performed in any appropriate manner, such as via a user interface (such as user interface 56 schematically illustrated in FIG. 1). The user interface may include and/or be any appropriate interface for receiving a user input, examples of which include a monitor, a touchscreen, a keyboard, and/or a mouse. Additionally or alternatively, the receiving the height calibration structure architecture at 210 may include accessing a known and/or stored quantity associated with the probe system and/or the capacitive displacement sensor, such as a known value of the sensing tip surface area.

As additionally shown in FIG. 3, the calculating the layer impedance magnitude of each substrate layer at 220 may include calculating, at 222, a layer resistance of at least one substrate layer and/or calculating, at 224, a layer reactance of at least one substrate layer. In such examples, the calculating the layer resistance at 222 and/or the calculating the layer reactance at 224 is at least partially based upon the height calibration structure architecture. For example, and as discussed, the calculating the layer resistance at 222 may be based, at least in part, on the layer thickness of each substrate layer and/or the electrical resistivity of each substrate layer. As a more specific example, the calculating the layer resistance at 222 may include calculating a resistance $R=\rho t_n/A$ based on the electrical resistivity $\rho$ of the substrate layer, the cross-sectional area A of the sensing tip, and the thickness $t_n$ of the substrate layer. Similarly, and as discussed, the calculating the layer reactance at 224 may include calculating a layer capacitance $C=\varepsilon_r\varepsilon_0 A/t_n$ based on the relative permittivity $\varepsilon_r$ of the substrate layer, the sensing tip surface area A of the sensing tip, and the thickness $t_n$ of the substrate layer. The layer reactance then may be calculated as $X(f)=[2\pi fC]^{-1}=d/(2\pi f\varepsilon_r\varepsilon_0 A)$.

In an example in which the calculating the impedance magnitude of each substrate layer at 220 includes both the calculating the layer resistance at 222 and the calculating the layer reactance at 224, the calculating at 220 additionally may include comparing the layer resistance and the layer reactance of each substrate layer. For example, in general, the net impedance of a given substrate layer that has a layer resistance R and a layer reactance $Z_C$ may be determined by modeling the substrate layer as a perfectly resistive circuit element with the layer resistance in parallel with a perfectly capacitive circuit element with the layer reactance. Thus, the overall impedance $Z_{tot}$ of the layer may be calculated as $$Z_{tot}=\left[\frac{1}{R}+\frac{1}{Z_C}\right]^{-1}.$$

In an example in which the layer resistance is much greater than the layer reactance (e.g. by a factor of 1,000 or more), the overall layer impedance then may be approximated as being equal to the layer reactance.

Similarly, in an example in which the layer reactance is much greater than the layer resistance (e.g., by a factor of 1,000 or more), the overall layer impedance then may be approximated as being equal to the layer resistance.

Subsequent to the calculating the layer impedance magnitude of each substrate layer at 220, the calculating the total layer impedance magnitude at 230 may include and/or consist of adding together the layer impedance magnitudes of each substrate layer. In this manner, the calculating the total layer impedance magnitude at 230 may include calculating the series impedance of the substrate layers of the height calibration structure. Stated differently, the calculating at 230 may include adding the resistance, the reactance, and/or the total impedance of each layer of the height calibration structure in series. In this manner, the calculating the total layer impedance magnitude at 230 may produce a number, a quantity, and/or a mathematical expression that depends upon the resistivity of one or more layers of the height calibration structure, the relative permittivity of one or more layers of the height calibration structure, the thickness of one or more layers of the height calibration structure, and/or the sensing tip surface area A. In an example in which the height calibration structure includes only the surface layer (i.e., an example in which the height calibration structure does not include a subsurface layer), the total layer impedance magnitude calculated at 230 may be equal to the layer impedance magnitude calculated at 220.

The measuring the measured impedance magnitude at 240 may include operatively utilizing the capacitive displacement sensor in any appropriate manner, as described herein. For example, and as shown in FIG. 3, the measuring the measured impedance magnitude at 240 may include applying, at 242, an alternating current (AC) excitation voltage signal to the sensing tip at an excitation frequency and/or measuring, at 244, a response current signal that is based on the excitation voltage signal. In such examples, when the excitation voltage signal is applied at a known voltage magnitude $V_{in}$ and the corresponding response current signal is measured to have a current magnitude $I_{out}$, the measuring the measured impedance magnitude at 240 then may include calculating the measured impedance magnitude as $$Z_{meas}=\frac{V_{in}}{I_{out}}.$$

In some examples, and as described herein, the calculating the calibrated capacitive height measurement at 260 includes comparing the measured impedance magnitude as measured at 240 to the total layer impedance magnitude as calculated at 230. Additionally or alternatively, the calculating the calibrated capacitive height measurement at 260 may include calculating the uncalibrated capacitive height measurement based on the measured impedance magnitude as measured at 240. Specifically, in such examples, the uncalibrated capacitive height measurement may be calculated as $d_{uncal}=2\pi f\varepsilon_r\varepsilon_0 AZ_{meas}$. In such examples, and as described herein, the calculating the calibrated capacitive height measurement at 260 may include calculating a difference between the uncalibrated capacitive height measurement and a height calibration correction factor corresponding to the total layer impedance magnitude as calculated at 230. In some such examples, the capacitive displacement sensor may be configured to generate and/or output the uncalibrated capacitive height measurement.

Subsequent to the calculating the total layer impedance magnitude at 230 and the measuring the measured impedance magnitude at 240, the calibrated capacitive height measurement may be determined, such as via comparison of the total layer impedance magnitude and the measured impedance magnitude. For example, and as shown in FIG. 3, the calculating the calibrated capacitive height measurement at 260 may include calculating, at 262, with the controller, a gap impedance magnitude that is equal to a difference between the measured impedance magnitude (as measured at 240) and the total layer impedance magnitude (as calculated at 230). Stated differently, the gap impedance magnitude (i.e., the electrical impedance of the gap between the sensing tip and the height calibration structure) may be determined by modeling the total measured impedance (as measured at 240) between the sensing tip and the bulk conductive layer as being equal to the sum of the total impedance of the height calibration structure (as calculated at 230) and the gap impedance magnitude.

Subsequent to the calculating the gap impedance magnitude at 262, the calculating the calibrated capacitive height measurement at 260 then may include calculating a sensing tip distance that corresponds to the calculated gap impedance magnitude. Specifically, and as discussed, the impedance $Z_{gap}$ of the gap separating the sensing tip and the height calibration structure generally is related to the sensing tip distance d as $Z_{gap}=d/(2\pi f \varepsilon_r \varepsilon_0 A)$, such that the calculating the calibrated capacitive height measurement at 260 may include calculating $d=Z_{gap}2\pi f \varepsilon_r \varepsilon_0 A$, where f is the excitation frequency of the AC excitation voltage signal utilized in the applying at 242, $\varepsilon_r$ is the relative permittivity of the medium occupying the gap, and A is the surface area of the sensing tip facing the height calibration structure.

In some examples, and as further shown in FIG. 3, the calculating the calibrated capacitive height measurement at 260 includes calculating, at 264, with the controller and based, at least in part, on the total layer impedance magnitude as calculated at 230, a height calibration correction factor. For example, the calculating at 264 may include calculating a height calibration correction factor that is at least substantially equal to a difference between the uncalibrated capacitive height measurement produced by the capacitive displacement sensor and the actual sensing tip distance. That is, the impedance of the height calibration structure generally will result in the uncalibrated capacitive height measurement being greater than the actual sensing tip distance. Thus, methods 200 also may calculate the calibrated capacitive height measurement via calculation of a distance (i.e., the height calibration correction factor) corresponding to the impedance of the height calibration structure. Accordingly, the calculating the height calibration correction factor at 264 may include calculating the height calibration correction factor as $\Delta d=Z_{sub}2\pi f \varepsilon_r \varepsilon_0 A$, where $Z_{sub}$ is the total layer impedance magnitude as calculated at 230. In such examples, the calculating the calibrated capacitive height measurement at 260 is based, at least in part, on the height calibration correction factor as calculated at 264. For example, the calculating the calibrated capacitive height measurement may include calculating a difference between the uncalibrated capacitive height measurement and the height calibration correction factor.

The above examples generally pertain to methods 200 of calculating the calibrated capacitive height measurement analytically; e.g., based upon known physical properties of the height calibration structure and via established mathematical relations. However, it is additionally within the scope of the present disclosure that methods 200 may include one or more steps for facilitating and/or refining the calculating the calibrated capacitive height measurement at 260 based upon empirical measurements of an impedance associated with the height calibration structure. For example, and as shown in FIG. 3, methods 200 additionally may include measuring, at 250, with the capacitive displacement sensor, a distance-dependent impedance. As an example, the measuring the distance-dependent impedance at 250 may include measuring the measured impedance magnitude with the capacitive displacement sensor as the sensing tip distance is varied. Specifically, because the capacitive impedance of the gap separating the sensing tip and the height calibration structure is related to the sensing tip distance as $Z_{gap}=d/(2\pi f \varepsilon_r \varepsilon_0 A)$, a plot of $Z_{gap}$ as a function of d is expected to be linear and pass through the origin.

However, the measured impedance $Z_{meas}$ measured by the capacitive displacement sensor additionally includes the (fixed) impedance contribution of the substrate $Z_{sub}$, such that $Z_{meas}=Z_{gap}+Z_{sub}$. Accordingly, a plot of $Z_{meas}$ as a function of d may be at least substantially linear but may intersect the y-axis at a value corresponding to $Z_{sub}$. In this manner, the measuring the measured impedance magnitude as the sensing tip distance is varied may enable a measurement of the impedance of the height calibration structure via extrapolation to determine the y-intercept of a plot of $Z_{meas}$ as a function of d.

As another example, the measuring the distance-dependent impedance at 250 may include measuring the measured impedance magnitude with the capacitive displacement sensor when the sensing tip distance is a known sensing tip distance. As an example, the capacitive displacement sensor and a probe (such as probe 14) each may be supported by a probe support body (such as probe support body 36) such that the sensing tip extends closer to the height calibration structure than does a probe tip (such as probe tip 16) of the probe. In such an example, the known sensing tip distance may be at least substantially zero, such as when the capacitive displacement sensor is brought into contact with the height calibration structure. However, this is not required, and it is additionally within the scope of the present disclosure that the known sensing tip distance is non-zero and/or that the capacitive displacement sensor is not configured to contact the height calibration structure. As an example, the capacitive displacement sensor and the probe each may be supported by the probe support body such that the probe tip extends closer to the height calibration structure than does the sensing tip. In such an example, the known sensing tip distance may be at least substantially equal to a tip offset (such as tip offset 45) between the sensing tip and the probe tip as measured along a direction parallel to the normal axis, such as when the probe tip is brought into contact with the height calibration structure. In other examples, the known sensing tip distance may be directly measured, such as with the imaging device and/or with an external reference measurement such as interferometric measurement.

In such examples, the calculating the total layer impedance magnitude at 230 may be based, at least in part, on the distance-dependent impedance measured at the known sensing tip distance. That is, in such examples, the impedance of the height calibration structure may be determined via comparison of the measured impedance magnitude (as measured at 240), and a capacitive impedance that would correspond to a gap of the known sensing tip distance may be calculated. Thus, a difference between the measured impedance magnitude and the calculated impedance magnitude corresponding to the known sensing tip distance may correspond to and/or equal the total impedance magnitude of the height calibration structure.

In some examples, probe systems 10 and/or methods 200 may facilitate a determination of a probe tip displacement (such as probe tip displacement 46) between the probe tip associated with the capacitive displacement sensor and the height calibration structure. Specifically, and with continued reference to FIG. 3, methods 200 additionally may include determining, at 270, with the controller and based, at least in part, on the calibrated capacitive height measurement as calculated at 260, the probe tip displacement.

As an example, and as discussed, the probe tip may be spaced apart from the sensing tip of the capacitive displacement sensor by the tip offset, as measured along a direction parallel to the normal axis, that is at least substantially fixed. Accordingly, in an example in which the probe tip extends closer to the height calibration structure than does the sensing tip, the determining the probe tip displacement at 270 may include subtracting the tip offset from the calibrated capacitive height measurement. Alternatively, in an example in which the sensing tip extends closer to the height calibration structure than does the probe tip, the determining the probe tip displacement at 270 may include adding the tip offset to the calibrated capacitive height measurement. In some examples, the tip offset may be a known quantity, such as may be related to and/or determined by a predetermined configuration of a probe assembly (such as probe assembly 30) to which the capacitive displacement sensor and the probe belong. In other examples, the determining the probe tip displacement at 270 may include measuring the tip offset, such as with the imaging device.

With reference to probe system 10 of FIG. 2 and methods 200 of FIG. 3, an example of a determination of sensing tip distance 44 follows below. In the following example, A represents the area of sensing tip 42 parallel to surface layer 122 and/or in a plane perpendicular to normal axis 12, d represents the value of sensing tip distance 44, $t_1$ represents the thickness of surface layer 122, $t_2$ represents the thickness of first subsurface layer 125, $t_3$ represents the thickness of second subsurface layer 126, and $t=t_1+t_2+t_3$ represents the total thickness of height calibration structure 120. As used herein, the term "thickness," as used to characterize a component of probe system 10, generally refers to an extent of the component along a direction parallel to normal axis 12. For the purposes of this example, it is assumed that sensing tip 42 is separated from surface layer 122 by gap 48 in the form of a vacuum with infinite electrical resistivity. For the purposes of this example, it additionally is assumed that surface layer 122 and second subsurface layer 126 each are conductive materials with electrical resistivity ρ and that first subsurface layer 125 is an insulating material with a relative permittivity $\varepsilon_r$.

With reference to the example of FIG. 2, the receiving the height calibration structure architecture at 210 may include receiving the thicknesses $t_1$, $t_2$, and $t_3$, as well as the electrical resistivity ρ of each of first surface layer 122 and second subsurface layer 126 and the relative permittivity $\varepsilon_r$ of first subsurface layer 125. The receiving the height calibration structure architecture at 210 additionally may include receiving the sensing tip surface area A.

With continued reference to the example of FIG. 2, the calculating the layer impedance magnitudes at 220 may include the calculating the layer resistance of each layer at 222 and/or the calculating the layer reactance of each layer at 224. Because each of surface layer 122 and second subsurface layer 126 is a conductor, it is assumed that the layer impedance magnitude of each of the surface layer and the second subsurface layer is dominated by the resistance of each layer. Accordingly, the layer impedance magnitude $Z_1$ of surface layer 122 may be calculated as $Z_1=\rho_1 t_1/A$ and the layer impedance magnitude $Z_3$ of second subsurface layer 126 may be calculated as $Z_3=\rho_3 t_3/A$. Because first subsurface layer 125 is an insulator, it is assumed that the layer impedance magnitude of the first subsurface layer is dominated by the capacitive reactance of the first subsurface layer. Accordingly, the layer impedance magnitude $Z_2$ of first subsurface layer 125 may be calculated as $Z_2=t_2/(2\pi f \varepsilon_r \varepsilon_0 A)$, where f is the frequency of an electrical signal that encounters the first subsurface layer. Accordingly, the calculating the total layer impedance magnitude at 230 may include calculating $$Z_{tot} = \frac{\rho_1 t_1}{A} + \frac{t_2}{2\pi f \varepsilon_r \varepsilon_0 A} + \frac{\rho_3 t_3}{A}.$$

Simplifying this expression yields $$Z_{tot} = \frac{t_2 + 2\pi f \varepsilon_r \varepsilon_0 (\rho_1 t_1 + \rho_3 t_3)}{2\pi f \varepsilon_r \varepsilon_0 A}.$$

Subsequent to the calculating the total layer impedance magnitude at 230, applying method 200 to the example of FIG. 2 further includes measuring the measured impedance magnitude $Z_{meas}$ at 240 as described above and calculating the calibrated capacitive height measurement at 260 based, at least in part, on $Z_{meas}$. For example, the calculating the calibrated capacitive height measurement at 260 may include the calculating the gap impedance magnitude $Z_{gap}$ at 262 as $Z_{gap}=Z_{meas}-Z_{tot}$. The gap impedance magnitude then may be related to the sensing tip distance d as $d=Z_{gap}2\pi f \varepsilon_r \varepsilon_0 A$, where f is the excitation frequency of the AC excitation voltage signal utilized in the applying at 242, $\varepsilon_r$ is the relative permittivity of the medium occupying the gap, and A is the surface area of the sensing tip facing the height calibration structure.

With continued reference to the example of FIG. 2, probe tip 16 of probe 14 extends closer to height calibration structure 120 than does sensing tip 42 of capacitive displacement sensor 40. Specifically, in the example of FIG. 2, sensing tip distance 44 exceeds probe tip displacement 46 by tip offset 45. Given a known tip offset Δd, the determining the probe tip displacement $d_p$ at 270 thus may include calculating $d_p=d-\Delta d$.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It also is within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Illustrative, non-exclusive examples of probe systems and methods according to the present disclosure are presented in the following enumerated paragraphs:

A1. A method of utilizing a probe system to generate a calibrated capacitive height measurement, wherein the probe system includes a probe assembly with a probe support body that supports a capacitive displacement sensor that terminates in a sensing tip that is configured to be positioned in a spaced-apart relation relative to a substrate, and wherein the capacitive displacement sensor is configured to generate an uncalibrated capacitive height measurement that at least partially represents a sensing tip distance of the sensing tip from the substrate, optionally as measured along a direction parallel to a normal axis that extends at least substantially perpendicular to the substrate, the method comprising:

receiving, with a controller, a height calibration structure architecture of a height calibration structure of the substrate, wherein the height calibration structure architecture includes information regarding one or more substrate layers of the height calibration structure;

calculating, with the controller and based, at least in part, on the height calibration structure architecture, a layer impedance magnitude of each substrate layer of the one or more substrate layers;

calculating, with the controller and based, at least in part, on the calculating the layer impedance magnitude of each substrate layer of the one or more substrate layers, a total layer impedance magnitude of the height calibration structure;

measuring, with the capacitive displacement sensor, a measured impedance magnitude; and calculating, with the controller, the calibrated capacitive height measurement based, at least in part, on the total layer impedance magnitude and the measured impedance magnitude.

A2. The method of paragraph A1, wherein the one or more substrate layers includes a surface layer and one or more subsurface layers.

A3. The method of any of paragraphs A1-A2, wherein the receiving the height calibration structure architecture includes receiving one or more of:

(i) a layer thickness of each substrate layer of the one or more substrate layers, optionally as measured along a direction parallel to the normal axis;

(ii) an electrical resistivity of each substrate layer of the one or more substrate layers;

(iii) a relative permittivity of each substrate layer of the one or more substrate layers; and (iv) a sensing tip surface area of the sensing tip that faces the height calibration structure, optionally as measured in a plane perpendicular to the normal axis.

A4. The method of any of paragraphs A1-A3, wherein the receiving the height calibration structure architecture includes receiving via a user interface that is configured to receive a user input.

A5. The method of paragraph A4, wherein the user interface includes one or more of a monitor, a touchscreen, a keyboard, and a mouse.

A6. The method of any of paragraphs A1-A5, wherein the calculating the layer impedance magnitude of each substrate layer of the one or more substrate layers includes calculating a layer resistance of at least one substrate layer of the one or more substrate layers based, at least in part, on one or both of a/the layer thickness of each substrate layer and a/the electrical resistivity of each substrate layer.

A7. The method of any of paragraphs A1-A6, wherein the calculating the layer impedance magnitude of each substrate layer of the one or more substrate layers includes calculating a layer reactance of at least one substrate layer of the one or more substrate layers; wherein the calculating the layer reactance includes calculating a layer capacitance of the at least one substrate layer of the one or more substrate layers; and wherein the calculating the layer capacitance is based, at least in part, on one or both of a/the layer thickness of each substrate layer of the at least one substrate layer and a/the relative permittivity of each substrate layer of the at least one substrate layer.

A8. The method of paragraph A7, when dependent from paragraph A6, wherein the calculating the layer impedance magnitude of each substrate layer of the one or more substrate layers includes comparing the layer resistance and the layer reactance of each of the at least one substrate layer.

A9. The method of paragraph A8, wherein the calculating the layer impedance magnitude of each substrate layer of the one or more substrate layers includes approximating the impedance magnitude of each of the at least one substrate layer as the lesser of the layer resistance and the layer reactance of each of the at least one substrate layer.

A10. The method of any of paragraphs A1-A9, wherein the calculating the total impedance magnitude of the height calibration structure includes adding together the layer impedance magnitudes of each of the one or more substrate layers.

A11. The method of any of paragraphs A1-A10, wherein the measuring the measured impedance magnitude includes applying an alternating current (AC) excitation voltage signal to the sensing tip at an excitation frequency.

A12. The method of paragraph A11, wherein the measuring the measured impedance magnitude further includes:

(i) measuring a response current signal that is based on the excitation voltage signal; and (ii) calculating the measured impedance magnitude based, at least in part, on each of a magnitude of the excitation voltage signal and a magnitude of the response current signal.

A13. The method of any of paragraphs A1-A12, wherein the calculating the calibrated capacitive height measurement includes:

(i) calculating, with the controller, a gap impedance magnitude that is equal to a difference between the measured impedance magnitude and the total layer impedance magnitude; and (ii) calculating, with the controller and based, at least in part, on the gap impedance magnitude, the calibrated capacitive height measurement.

A14. The method of paragraph A13, wherein the calculating the calibrated capacitive height measurement additionally is at least partially based on a/the excitation frequency.

A15. The method of any of paragraphs A1-A14, further comprising calculating, with the controller and based, at least in part, on the total layer impedance magnitude, a height calibration correction factor; and wherein the calculating the calibrated capacitive height measurement is based, at least in part, on the height calibration correction factor.

A16. The method of paragraph A15, wherein the calculating the calibrated capacitive height measurement includes calculating a difference between the uncalibrated capacitive height measurement and the height calibration correction factor.

A17. The method of any of paragraphs A1-A16, further comprising measuring, with the capacitive displacement sensor, a distance-dependent impedance; wherein the measuring the distance-dependent impedance includes one or both of:

(i) measuring the measured impedance magnitude as the sensing tip distance is varied; and (ii) measuring the measured impedance magnitude at a known sensing tip distance; and wherein the calculating the calibrated capacitive height measurement is based, at least in part, on the distance-dependent impedance.

A18. The method of paragraph A17, wherein the known sensing tip distance is at least substantially zero.

A19. The method of paragraph A17, wherein the known sensing tip distance is non-zero.

A20. The method of any of paragraphs A17-A19, wherein the calculating the total layer impedance magnitude of the height calibration structure is based, at least in part, on the distance-dependent impedance.

A21. The method of any of paragraphs A1-A20, wherein the probe system further includes a probe with a probe tip that is spaced apart from the substrate by a probe tip displacement, optionally as measured along a direction parallel to the normal axis, and wherein the method further includes determining, with the controller and based, at least in part, on the calibrated capacitive height measurement, the probe tip displacement.

A22. The method of paragraph A21, wherein the probe tip is spaced apart from the sensing tip by a tip offset, optionally as measured along a direction parallel to the normal axis, that is at least substantially fixed, and wherein the determining the probe tip displacement includes one of:

(i) adding the tip offset to the calibrated capacitive height measurement; and (ii) subtracting the tip offset from the calibrated capacitive height measurement.

A23. The method of paragraph A22, wherein the determining the probe tip displacement includes measuring the tip offset, optionally with an imaging device.

B1. A probe system, comprising:

a chuck with a chuck support surface configured to support a substrate that includes one or more devices under test (DUTs);

a probe assembly configured to test the one or more DUTs; and a controller programmed to control the operation of the probe system according to the method of any of paragraphs A1-A23;

wherein the probe assembly includes:

(i) a probe support body;

(ii) one or more probes operatively supported by the probe support body, each probe of the one or more probes configured to test a corresponding DUT of the one or more DUTs; and (iii) a capacitive displacement sensor supported by the probe support body;

wherein the capacitive displacement sensor terminates in a sensing tip that is configured to be positioned in a spaced-apart relation relative to the substrate; and wherein the capacitive displacement sensor is configured to generate an uncalibrated capacitive height measurement that at least partially represents a sensing tip distance of the sensing tip from the substrate, optionally as measured along a direction parallel to a normal axis that extends at least substantially perpendicular to the substrate.

B2. The probe system of paragraph B1, wherein each probe includes a probe tip that faces the substrate during operative use of the probe system, and wherein the probe support body is configured to maintain the sensing tip and the probe tip at least substantially fixed relative to each other such that a tip offset, optionally as measured along a direction parallel to the normal axis, is at least substantially fixed during operative use of the probe system.

B3. The probe system of paragraph B2, wherein the probe system is configured to measure a probe tip displacement between the probe tip and the substrate, optionally as measured along a direction parallel to the normal axis.

B4. The probe system of any of paragraphs B1-B3, wherein each probe includes an optical fiber that includes a fiber tip; wherein each optical fiber is configured to one or both of transmit optical signals to the DUT and receive optical signals from the DUT via the fiber tip.

B5. The probe system of paragraph B4, wherein the optical fiber is configured to interface with the DUT via an optical coupler of the DUT.

B6. The probe system of paragraph B5, wherein the optical coupler includes one or more of a grating coupler and a waveguide.

B7. The probe system of any of paragraphs B1-B6, wherein the probe assembly includes a probe positioner that is operatively coupled to the probe support body and that is configured to selectively position the probe support body relative to the substrate.

B8. The probe system of paragraph B7, wherein the probe positioner is configured to position the probe support body such that the fiber tip is at least substantially aligned with a corresponding optical coupler.

B9. The probe system of any of paragraphs B7-B8, wherein the controller is configured to generate and transmit a probe positioner control signal to selectively control the probe positioner.

B10. The probe system of any of paragraphs B7-B9, further comprising a platen that supports the probe positioner relative to the chuck.

B11. The probe system of any of paragraphs B1-B10, further comprising a chuck translation stage that operatively supports the chuck and that is configured to selectively and operatively translate the chuck relative to at least a portion of the probe assembly.

B12. The probe system of paragraph B11, wherein the controller is configured to generate and transmit a translation stage control signal to selectively control the chuck translation stage.

B13. The probe system of any of paragraphs B1-B12, further comprising one or more imaging devices configured to receive an optical image of one or both of:

(i) at least a portion of the probe assembly; and (ii) at least a portion of the substrate.

B14. The probe system of paragraph B13, wherein at least one imaging device of the one or more imaging devices is configured to receive the optical image along a direction that is at least substantially parallel to the normal axis.

B15. The probe system of any of paragraphs B13-B14, wherein at least one imaging device of the one or more imaging devices is configured to receive the optical image along a direction that is at least substantially perpendicular to the normal axis.

B16. The probe system of any of paragraphs B13-B15, wherein each imaging device of the one or more imaging devices includes one or more of a microscope, a microscope that includes an eyepiece, a microscope that does not include an eyepiece, a camera, a charge-coupled device, an imaging sensor, a solid-state imaging device, a C-MOS imaging device, and a lens.

B17. The probe system of any of paragraphs B1-B16, further comprising a signal generation and analysis assembly configured to one or more of:

(i) generate a test signal;

(ii) provide the test signal to the DUT via the probe;

(iii) receive a resultant signal from the DUT via the probe; and (iv) analyze the resultant signal.

B18. The probe system of paragraph B17, wherein the controller includes the signal generation and analysis assembly.

B19. The probe system of any of paragraphs B1-B18, wherein the capacitive displacement sensor includes a guard electrode that at least substantially circumferentially surrounds the sensing tip; wherein the capacitive displacement sensor is configured to supply a guard voltage to the guard electrode during operative use of the capacitive displacement sensor to generate the uncalibrated capacitive height measurement; and wherein the probe assembly is configured to at least partially disable the guard electrode during operative use of the probe assembly to test the DUT.

INDUSTRIAL APPLICABILITY

The probe systems and methods disclosed herein are applicable to the semiconductor manufacturing and test industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of utilizing a probe system to generate a calibrated capacitive height measurement, wherein the probe system includes a probe assembly with a probe support body that supports a capacitive displacement sensor that terminates in a sensing tip that is configured to be positioned in a spaced-apart relation relative to a substrate, and wherein the capacitive displacement sensor is configured to generate an uncalibrated capacitive height measurement that at least partially represents a sensing tip distance of the sensing tip from the substrate, the method comprising:
receiving, with a controller, a height calibration structure architecture of a height calibration structure of the substrate, wherein the height calibration structure architecture includes information regarding one or more substrate layers of the height calibration structure;
calculating, with the controller and based, at least in part, on the height calibration structure architecture, a layer impedance magnitude of each substrate layer of the one or more substrate layers;
calculating, with the controller and based, at least in part, on the calculating the layer impedance magnitude of each substrate layer of the one or more substrate layers, a total layer impedance magnitude of the height calibration structure;
measuring, with the capacitive displacement sensor, a measured impedance magnitude; and
calculating, with the controller and based, at least in part, on the total layer impedance magnitude and the measured impedance magnitude, the calibrated capacitive height measurement.

2. The method of claim 1, wherein the receiving the height calibration structure architecture includes receiving one or more of:
(i) a layer thickness of each substrate layer of the one or more substrate layers;
(ii) an electrical resistivity of each substrate layer of the one or more substrate layers;
(iii) a relative permittivity of each substrate layer of the one or more substrate layers; and
(iv) a sensing tip surface area of the sensing tip that faces the height calibration structure.

3. The method of claim 2, wherein the calculating the layer impedance magnitude of each substrate layer of the one or more substrate layers includes calculating a layer resistance of at least one substrate layer of the one or more substrate layers based, at least in part, on one or both of the layer thickness of each substrate layer and the electrical resistivity of each substrate layer.

4. The method of claim 2, wherein the calculating the layer impedance magnitude of each substrate layer of the one or more substrate layers includes calculating a layer reactance of at least one substrate layer of the one or more substrate layers; wherein the calculating the layer reactance includes calculating a layer capacitance of the at least one substrate layer of the one or more substrate layers; and wherein the calculating the layer capacitance is based, at least in part, on one or both of the layer thickness of each substrate layer of the at least one substrate layer and the relative permittivity of each substrate layer of the at least one substrate layer.

5. The method of claim 2, wherein the calculating the layer impedance magnitude of each substrate layer of the one or more substrate layers includes:
(i) comparing the layer resistance and the layer reactance of each of the at least one substrate layer; and
(ii) approximating the impedance magnitude of each of the at least one substrate layer as the lesser of the layer resistance and the layer reactance of each of the at least one substrate layer.

6. The method of claim 1, wherein the calculating the total impedance magnitude of the height calibration structure includes adding together the layer impedance magnitudes of each of the one or more substrate layers.

7. The method of claim 1, wherein the measuring the measured impedance magnitude includes applying an alternating current (AC) excitation voltage signal to the sensing tip at an excitation frequency; and wherein the measuring the measured impedance magnitude further includes:
(i) measuring a response current signal that is based on the excitation voltage signal; and
(ii) calculating the measured impedance magnitude based, at least in part, on each of a magnitude of the excitation voltage signal and a magnitude of the response current signal.

8. The method of claim 1, wherein the calculating the calibrated capacitive height measurement includes:
(i) calculating, with the controller, a gap impedance magnitude that is equal to a difference between the measured impedance magnitude and the total layer impedance magnitude; and
(ii) calculating, with the controller and based, at least in part, on the gap impedance magnitude, the calibrated capacitive height measurement.

9. The method of claim 1, further comprising calculating, with the controller and based, at least in part, on the total layer impedance magnitude, a height calibration correction factor; and wherein the calculating the calibrated capacitive height measurement is based, at least in part, on the height calibration correction factor.

10. The method of claim 9, wherein the calculating the calibrated capacitive height measurement includes calculating a difference between the uncalibrated capacitive height measurement and the height calibration correction factor.

11. The method of claim 1, wherein the probe system further includes a probe with a probe tip that is spaced apart from the substrate by a probe tip displacement, and wherein the method further includes determining, with the controller and based, at least in part, on the calibrated capacitive height measurement, the probe tip displacement.

12. The method of claim 11, wherein the probe tip is spaced apart from the sensing tip by a tip offset, as measured along a direction parallel to a normal axis that extends at least substantially parallel to the substrate, that is at least substantially fixed, and wherein the determining the probe tip displacement includes one of:
   (i) adding the tip offset to the calibrated capacitive height measurement; and
   (ii) subtracting the tip offset from the calibrated capacitive height measurement.

13. The method of claim 12, wherein the determining the probe tip displacement includes measuring the tip offset with an imaging device.

14. A probe system, comprising:
   a chuck with a chuck support surface configured to support a substrate that includes one or more devices under test (DUTs);
   a probe assembly configured to test the one or more DUTs; and
   a controller programmed to control the operation of the probe system according to the method of claim 1;
   wherein the probe assembly includes:
   (i) a probe support body;
   (ii) one or more probes operatively supported by the probe support body, each probe of the one or more probes configured to test a corresponding DUT of the one or more DUTs; and
   (iii) a capacitive displacement sensor supported by the probe support body;
   wherein the capacitive displacement sensor terminates in a sensing tip that is configured to be positioned in a spaced-apart relation relative to the substrate; and wherein the capacitive displacement sensor is configured to generate an uncalibrated capacitive height measurement that at least partially represents a sensing tip distance of the sensing tip from the substrate.

15. The probe system of claim 14, wherein the capacitive displacement sensor includes a guard electrode that at least substantially circumferentially surrounds the sensing tip; wherein the capacitive displacement sensor is configured to supply a guard voltage to the guard electrode during operative use of the capacitive displacement sensor to generate the uncalibrated capacitive height measurement; and wherein the probe assembly is configured to at least partially disable the guard electrode during operative use of the probe assembly to test the DUT.

16. The probe system of claim 14, wherein each probe includes a probe tip that faces the substrate during operative use of the probe system, and wherein the probe support body is configured to maintain the sensing tip and the probe tip at least substantially fixed relative to each other such that a tip offset, as measured along a direction parallel to a normal axis that extends at least substantially perpendicular to the substrate, is at least substantially fixed during operative use of the probe system.

17. The probe system of claim 14, wherein each probe includes an optical fiber that includes a fiber tip; wherein each optical fiber is configured to one or both of transmit optical signals to the DUT and receive optical signals from the DUT via the fiber tip; and wherein the optical fiber is configured to interface with the DUT via an optical coupler of the DUT.

18. The probe system of claim 14, wherein the probe assembly includes a probe positioner that is operatively coupled to the probe support body and that is configured to selectively position the probe support body relative to the substrate.

19. The probe system of claim 14, further comprising one or more imaging devices configured to receive an optical image of one or both of:
   (i) at least a portion of the probe assembly; and
   (ii) at least a portion of the substrate;
   wherein each imaging device of the one or more imaging devices is configured to receive the optical image along a direction that is one of:
   (i) at least substantially parallel to a normal axis that extends at least substantially perpendicular to the substrate; and
   (ii) at least substantially perpendicular to the normal axis.

20. The probe system of claim 14, further comprising a signal generation and analysis assembly configured to one or more of:
   (i) generate a test signal;
   (ii) provide the test signal to the DUT via the probe;
   (iii) receive a resultant signal from the DUT via the probe; and
   (iv) analyze the resultant signal.

* * * * *